UNITED STATES PATENT OFFICE 2,249,601

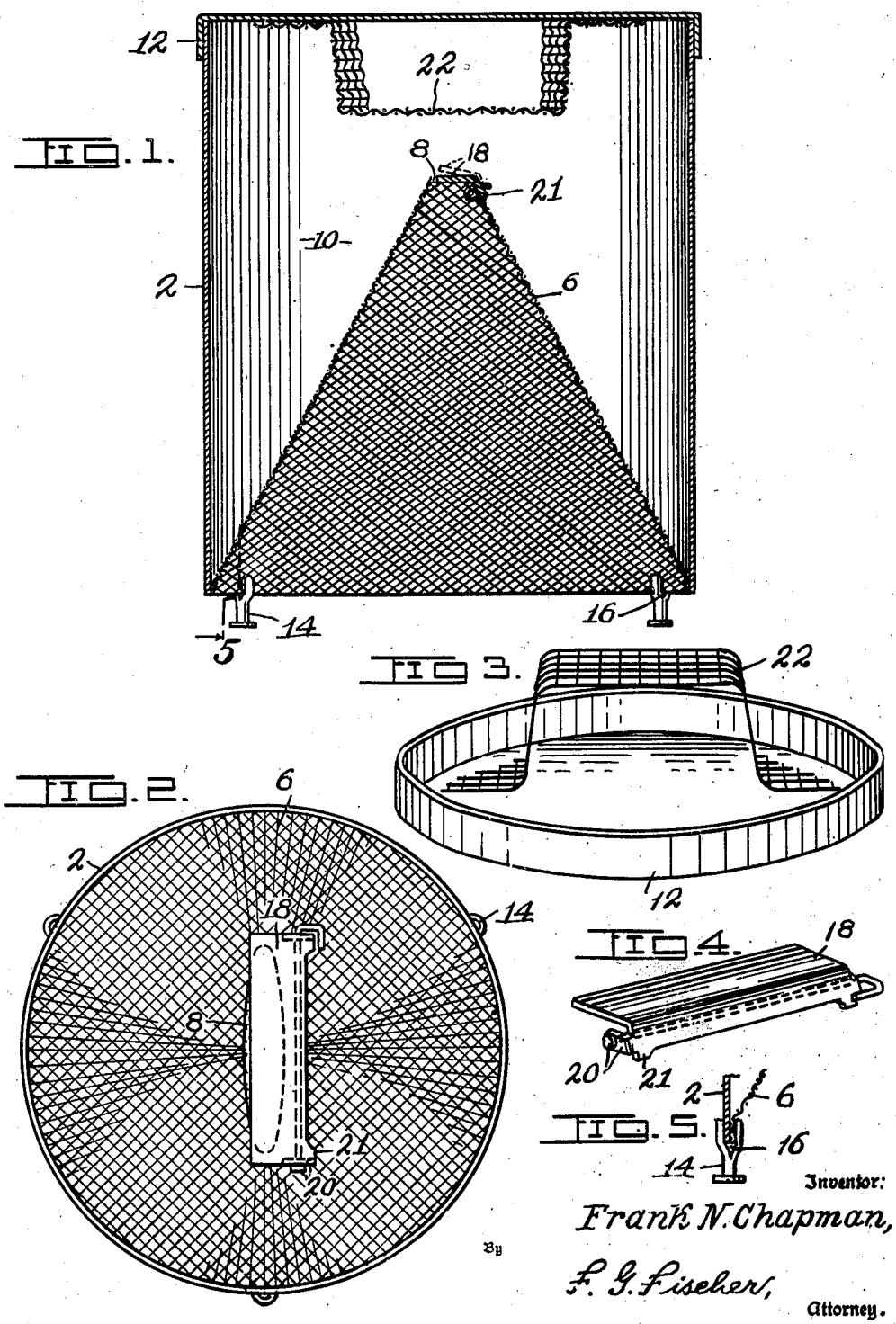

ROACH TRAP

Frank N. Chapman, Kansas City, Mo.

Application May 21, 1940, Serial No. 336,381

1 Claim. (Cl. 43—121)

My invention relates to a trap for catching roaches and other insects and one object of the invention is the provision of a captivity chamber having an inlet and a bait holder, which latter is located in close proximity to the former to entice the insects into the captivity chamber.

A further object of the invention is the provision of a removable lid for closing the captivity chamber and which is equipped with the bait holder so that the latter may be readily supplied with fresh bait when necessary.

Another object of the invention is the provision of legs which perform the dual function of supporting the device and holding some of the parts thereof in assembly.

Other objects will hereinafter appear and in order that the invention may be fully understood reference will now be had to the accompanying drawing, in which—

Fig. 1 is a vertical central section of the trap.

Fig. 2 is a plan view of the trap with the lid thereof removed.

Fig. 3 is an inverted perspective view of the lid with the bait holder.

Fig. 4 is a perspective view of a trap-door for controlling the inlet to the captivity chamber.

Fig. 5 is a fragmentary sectional view on line 5 of Fig. 1.

In carrying out the invention I provide an upright cylindrical body 2 which is open at its upper and lower ends and consists preferably of opaque material, such for instance as sheet metal.

The cylindrical body 2 is provided with a conical screen 6 which is open at its lower end and has an aperture 8 at its upper end to provide an inlet to the captivity chamber 10 formed by the cylindrical body 2, the conical screen 6, and a removable lid 12 which is employed to normally close the upper end of the cylindrical body 2, and like the latter, consists preferably of opaque material such as sheet metal.

The tubular body 2 and the conical screen 6 are held in assembly by means of a plurality of legs 14, the upper portions of which are slotted as indicated at 16 to receive the lower ends of the tubular body and the conical screen. The aperture 8 is controlled with a trap-door 18, the forward position of which partially closes the aperture 8 and the rear portion of which is bent downward and operably connected to the conical screen 6 by means of a hinge 20.

The rear end of the trap-door 18 has extensions 21 which project below the hinge 20 so that when the trap-door is pushed open by an insect entering the captivity chamber 10, said extensions will press against the more or less resilient conical screen 6, which together with the force of gravity, will positively close the trap-door after the insect has passed through the aperture 8. The lid 12 is provided at its under side with a bait holder 22 preferably in the form of a wire basket, the bottom of which supports the bait in close proximity to the aperture 8 to entice the insects into the captivity chamber 10. Although it is more convenient to supply bait to the bait holder 22 when the same is fixed to the removable lid 12, for the sake of economy in the construction of the device the lid 12 may be dispensed with in which event the upper end of the tubular body 2 may be closed with a permanent top having a bait holder to which access may be had on removal of the legs 14 and the conical screen 6.

In practice, insects on scenting the bait, will be attracted thereby towards the aperture 8 and will crawl upward through the conical screen 6, lift the trap-door 18, and pass through the aperture 8 into the captivity chamber 10. Any attempt of the insects to escape will be frustrated by the trap-door 18 and the sharp points of the wire screen surrounding the margin of the aperture 8.

The captive roaches may be readily disposed of by inverting the trap and pouring scalding water therein through the conical screen 6 to destroy the insects. The lid 12 may then be removed so that the dead insects can be dumped from the captivity chamber. The basket 22 is then supplied with fresh bait and lid 12 is replaced upon the upper end of the tubular body 2, whereupon the trap is ready for further use.

From the foregoing description, taken in connection with the drawing, it is apparent that I have provided a trap which is well adapted for the purpose intended, and while I have shown the preferred form of said trap I reserve the right to all other forms and modifications thereof as properly fall within the spirit and scope of the invention as claimed.

Having thus described my invention, what I claim and desire to secure by Letters Patent is:

In a device of the character described, an upright cylindrical body open at its lower end, a conical screen having its base snugly fitted in the lower portion of the body and provided at its apex with an aperture, said body and conical screen constituting a captivity chamber, and a trap-door hingedly mounted at the upper portion of the conical screen to partially close the aperture, the rear portion of said trap-door extending below the hinge to coact with the conical screen in partially closing the trap-door after the same has been opened.

FRANK N. CHAPMAN.